June 2, 1942.  J. F. JOHNSON  2,285,207
RAILWAY CAR
Filed May 1, 1940  2 Sheets-Sheet 1

INVENTOR
JOSEPH F. JOHNSON
BY
Cornelius Zabriskie
ATTORNEY

June 2, 1942.　　J. F. JOHNSON　　2,285,207
RAILWAY CAR
Filed May 1, 1940　　2 Sheets-Sheet 2

INVENTOR
JOSEPH F. JOHNSON
BY
ATTORNEY

Patented June 2, 1942

2,285,207

UNITED STATES PATENT OFFICE 2,285,207

RAILWAY CAR

Joseph F. Johnson, Chester, N. Y.

Application May 1, 1940, Serial No. 332,624

4 Claims. (Cl. 105—366)

This invention is a railway car and the primary object of the invention is to provide a practical working unit for use on railroads for the coordination of rail and highway transportation of general merchandise, milk, and other liquids in bulk.

The usual practice in the handling of freight in less than carload lots is to collect the same from the factory or warehouse, transport it by truck or trailer to the nearest point of rail shipment and unload it into box cars. Two or more consignments for different places may be placed in the same car which is commonly taken to a freight sorting depot where different consignments of freight from different shippers, but destined to a given rail point, are collected in the same car for direct shipment to that point. Upon arrival the goods are unloaded and forwarded by truck to the respective destinations. Shipment of freight in truck load quantities is commonly handled in this way with the result that the merchandise may be handled as much as six times while in transit. In some cases, the sorting and classifying of freight in less than carload lots is dispensed with and in such cases partially filled cars may travel long distances, or substantially full cars may be switched from one destination to another to permit of successive unloadings of respective bills of goods.

In the handling of milk the following methods have been widely used. The first consists in shipping delivery cans in freight cars which are usually refrigerated cars. Bottle milk in crates is frequently shipped the same way. This procedure entails the lifting of the cans or crates into and out of the cars at the shipping point and at the destination with frequent additional handling for truck transportation at the rail destination. Bulk milk is, however, more commonly shipped today in tank cars. These cars comprise a large tank permanently mounted on a railway car body and the milk is deposited in the tank at the creamery and drawn off at the rail destination into appropriate tanks or tank trucks to permit of its delivery at its ultimate destination.

All of these ways of transporting milk and freight in less than carload lots is expensive, not only to the railroad but to the shipper, and this expense is largely due to the cost of labor necessary to the repeated handling thereof. In fact, it has been found more economical to handle freight and milk by truck or trailer for distances up to approximately 150 miles. The railroads have suffered much loss of business by the practice of shipping by truck. This has steadily grown and is continuing to grow as the price of labor advances and the best minds in the railway field have sought vainly for some way to get back this short-haul business. Numerous attempts have been made to build special apparatus and special cars whereby tanked milk and freight in less than carload lots might be transported as units to facilitate handling, but, prior to this invention, all of these expedients for the handling of general freight or milk, have failed to meet the need. All of them have required special loading facilities, such as raised platforms, depressed tracks, stationary derricks, or overhead traveling cranes at isolated points along the right of way, where the cost of installing them more than offsets the profit of the business that might be obtained therefrom. In many cases, where transportation of complete loads as units has been contemplated, the cost of the equipment was so great to install and maintain as to render it utterly impractical, while in other cases where attempt was made to keep costs at a minimum, the arrangements were wholly inadequate.

It is the purpose of the present invention to provide practical working units which will solve the problem to which I have referred, in a relatively simple and economical manner with minimum upkeep and maintenance.

In its preferred practical form, this invention comprises a flat car having a body of the depressed or well type, i. e., a car wherein the major portion of the length of the body, between the trucks, is depressed or supported at a lower elevation than the ends thereof, so that it will be relatively close to the rails. On this depressed portion of the body is mounted one or more rotatable decks, each of such size as to receive the rear wheels of a truck trailer. At two of the opposite sides of each deck are pivoted ramps or runways by means of which a tractor, with trailer attached, may be run on and off of the deck either in a forward direction or by backing the trailer on to the deck. At the other two opposite sides of each deck are upstanding rigid side walls with associated upright columns or masts mounted on and rigid with the deck and equipped with hoisting means for raising and lowering the ramps or runways as and when desired. Means is also preferably associated with each deck whereby it may be rotated, although this may be accomplished manually. In any event, when the deck is in one position a trailer may be placed thereon under the power of the tractor which normally transports it, and thereafter the tractor may be disconnected and the deck, with trailer thereon, may be rotated through 90° to bring the forward end of the trailer inboard of the car with the attaching end of the trailer over the adjacent raised end of the car to which it may be secured for rail shipment. Means are also preferably associated with the deck to lift the body of the trailer off of its springs and to obviate lateral sway of the trailer with respect to the car.

My invention, embodying the foregoing features and others which will be hereinafter more fully explained, entirely eliminates the necessity for special locations or cranes for loading or unloading, for the trailers or even complete trucks may be positioned on or taken off at any point along the railroad's right of way to which a truck may have access under its own power. No depressed tracks or raised approaches are required or costly hoisting equipment either at main terminals or at way stations. In fact, the loading or unloading of the car may be accomplished at any cross road. Moreover, no special equipment is required in truck or trailer construction, and conventional trailers, such as are now commonly employed on the open road, can be more economically transported by rail than by roadway because there is practically no labor handling costs incident to loading or unloading the same upon the car of this invention.

Features of the invention, other than those adverted to, will be apparent from the hereinafter detailed description and claims, when read in conjunction with the accompanying drawings.

The accompanying drawings illustrate one practical embodiment of the invention, but the construction therein shown is to be understood as illustrative, only, and not as defining the limits of the invention.

Figure 1 is a perspective view of a freight car embodying the present invention. This view, which is more or less pictorial, shows the car equipped with two rotary decks, one of which supports a trailer of the van type loaded in condition for shipment, and the other of which is shown supporting a tank trailer in loaded condition and positioned for removal from the car or for movement with the deck into shipping position. A trailer tractor is also indicated in this view.

Figure 1:
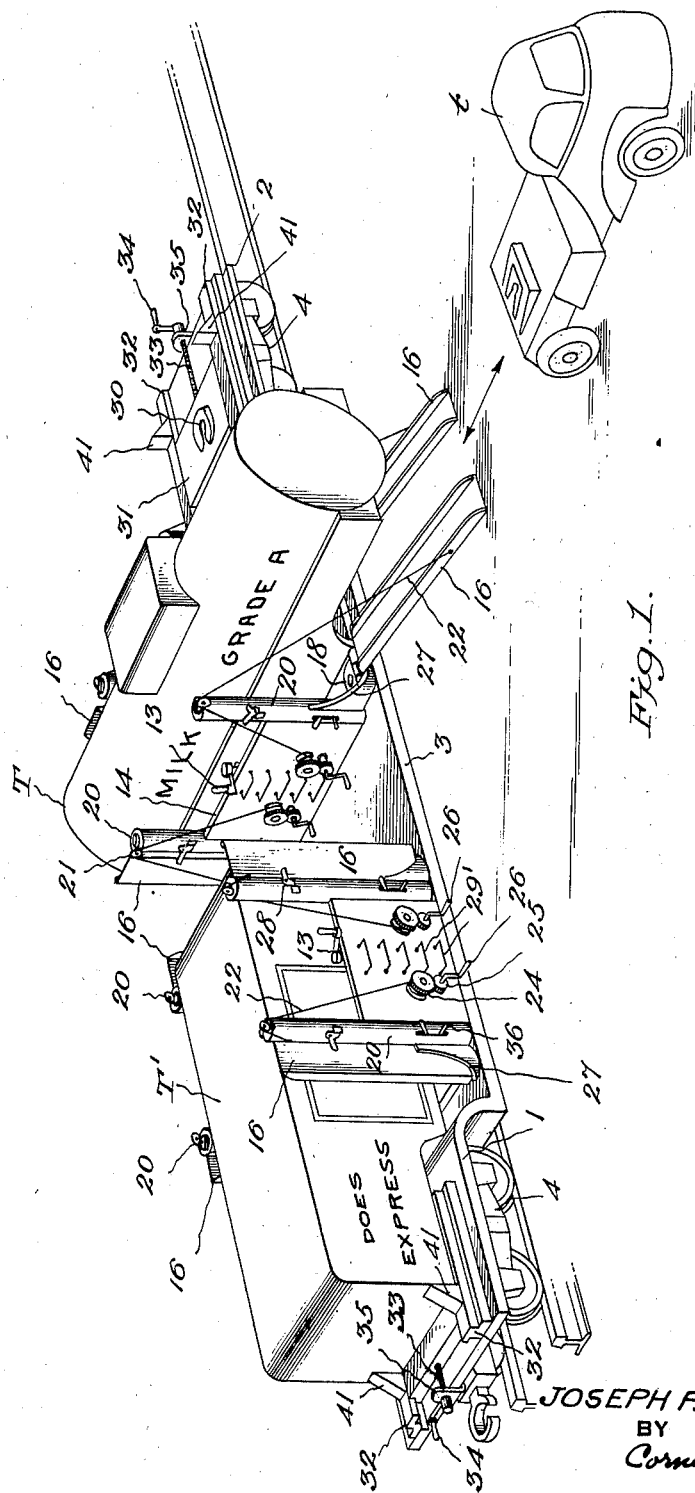

The car shown in the drawings has raised ends 1 and 2 which may conveniently be of a height of the conventional flat car, and between these raised ends, the intermediate portion of the car body is depressed, as shown at 3, so that the car is of the well type. Appropriate trucks 4 are positioned below the raised ends and may be of any conventional form. The couplings, air brakes, steam connections, etc. are preferably of the conventional kind used for passenger service, so that the car may be coupled into a passenger train or fast freight. I do not consider it necessary to go into these details of car fabrication as they may follow approved specification of well-type car design.

Figure 3:
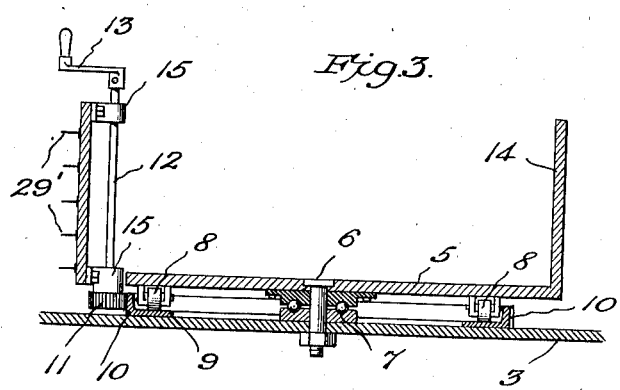
Figure 3 is a section in the plane of the line 3—3 of Figure 2.

In carrying out the present invention on a well type car, I mount on the depressed portion 3 thereof one or more rotary decks, two of which are shown in Figure 1 for the purpose of illustration. Each of these decks consists essentially of a rigid platform 5 which may be built up structurally according to any design which will meet engineering requirements. The platform may be and is shown of rectangular shape and it is pivoted at its center in the medial line of the car to the depressed portion 3 by a king bolt 6, preferably with anti-friction bearings 7, indicated diagrammatically in Figure 3. To relieve the king bolt of bending stresses, the under side of the deck is provided with an annular series of circumferentially spaced apart rollers 8, adapted to ride on a circular track 9 fixed on the body of the car. This mounting will provide for easy rotation of the deck while supporting heavy loads. The deck may be rotated manually or through the use of suitable power mechanism operated either from a power driven prime mover or by hand. Any suitable means may be provided for this purpose, but to illustrate one practical means, the track 9 is shown at its outer periphery with an upstanding flange 10 having external gear teeth forming a rack adapted to mesh with a pinion 11 mounted on an upright shaft 12. This shaft is operable by a crank 13, and, when the crank is rotated, the pinion 11 will be caused to traverse the annular rack and thus transmit rotation of the deck. Two of the opposite sides of the deck are shown as provided with upstanding side walls 14 and the shaft 12 has bearings 15 supported by one of these walls.

Mounted at the other two opposite edges of the deck are suitable ramps or runways. They may be of any appropriate construction, but are shown as channel sections 16, two of which are mounted at each of said edges. The channel sections are sufficiently wide as to permit them to conveniently accommodate the wheels of a truck and trailer and, at their inboard ends, they are hinged as indicated at 17 to supporting plates 18. These supporting plates are of substantially semi-circular form and are set into depressions in the platform 5 and secured therein by vertical pivot pins 19, so that they are adapted for articulation within the depressions in which they are received, flush with the upper face of the platform.

Positioned adjacent each of the four corners of the deck is an upstanding stanchion or column 20. Four of these columns are shown, although one at each side of the platform may be used if desired. They are rigid with the deck and are adapted to rotate therewith and they may conveniently be welded or otherwise permanently secured to the opposite ends of the side walls 14. Each is provided near its upper end with a pivoted sheave or block 21 forming part of a hoisting tackle for the raising and lowering of the ramps 16. Any appropriate tackle or rigging may be used in this connection, but, for illustration, each ramp is shown as shackled to one end of a cable 22 which passes upwardly over the corresponding block 21 and thence to a winding drum 23 mounted on the adjacent side wall 14. Each winding drum has rigid therewith a gear 24 meshing with a pinion 25 to which is fixed a crank 26, and through operation of the cranks, the cables 22 may be selectively manipulated to raise or lower the ramps as desired. Suitable locking dogs, friction brakes or other adjuncts appropriate to the operation of winding and lifting drums may be associated with this apparatus if desired.

Figure 2:
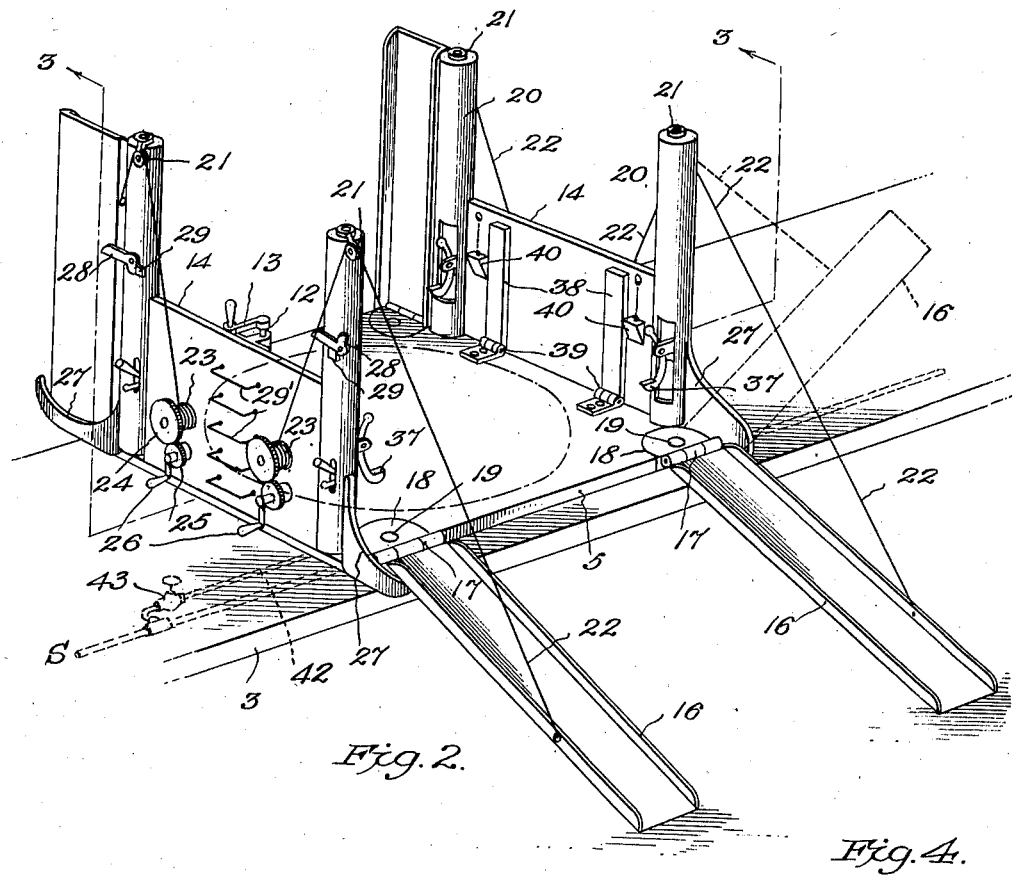
Figure 2 is a fragmental perspective of a portion of the length of the car showing one of the decks in loading and unloading position and unencumbered by the trailer.

Through the rigging described, the ramps may be raised from the position shown in full lines at the forward side of Figure 2 into the full line position at the after side of this figure, i. e., from downwardly inclined loading position to substantially vertical position and vice versa. Also, by virtue of the pivot pins 19, these ramps may be moved from positions at the front and back edges of the deck in Figure 2 into upstanding positions at the side edges thereof, as indicated at the back of the deck in this figure. The raising and lowering is accomplished through manipulation of the cables, but the pivotal movement of the ramps may be accomplished either manually or mechanically, as by cam tracks 27 associated with the columns 20. It will be noted in this connection that the line of pull of each cable 21 is outside of the axis of pivotal mounting of the corresponding plate 18, so that as the ramps are raised, they tend to turn in the direction of the pull. The shaping of the cam tracks 27 is such as to guide them, during elevation, into the vertical position indicated, whereas, when they are lowered, they will ride these cam tracks into the lowered positions shown. When the ramps are in upright position, they may be locked by latches 28 which may be released by swinging them back against stops 29. Appropriate means may be provided for locking and sealing these latches in retaining position.

If it be assumed that the parts thus far described are in positions shown in Figures 1 and 2, it will be apparent that a trailer, such as the tank trailer T of Figure 1, may be backed up the lowered ramps 16 by a suitable tractor t, also shown in Figure 1, so as to position the trailer on the deck 5. If desired, however, the rear ramps may be lowered, so that the tractor may be driven up the rear ramps and down the front ramps to position the trailer on the deck. When thus positioned the tractor and trailer are brought to rest. The wheels of the trailer are then anchored by suitable chocks, the trailer is uncoupled from the tractor and the usual underneath support with which all trailers are equipped is lowered onto the upper surface of the deck to raise and support the trailer in horizontal position. The tractor may then be driven away leaving the trailer in place on the deck. The ramps are then raised by manipulating the cranks 26 and the crank 13 then turned by a workman standing on the ladder steps 29 of the side wall 14 for the purpose of revolving the deck through 90° to bring the upper fifth wheel of the trailer above the raised end 2. Each raised end of the car is provided with a lower fifth wheel 30 of any conventional form, such as is commonly mounted on tractors adapted for cooperation with trailers. The fifth wheel 30 is thus adapted to receive the king pin of the trailer and has the conventional adjuncts to lock the pin in place.

When the fifth wheel 30 has thus been brought into proper position, the underneath support of the trailer is actuated to lower the upper fifth wheel and king pin of the trailer into engagement with the lower fifth wheel 30 and these parts are locked together.

The lower fifth wheel 30 may be supported upon a sliding platform 31, the lateral edges of which are adapted to slide in guides 32 fixed on the car body and means may be provided for adjusting this sliding platform to the length of the particular trailer that may be supported on the deck. For illustration, the sliding platform is shown as having threaded connection with a rod 33 provided at its outer end with a crank 34 and operating through a fixed bracket 35 on the car body, so that, by manipulation of the crank, the sliding platform may be adjusted to the trailer.

Figure 4:
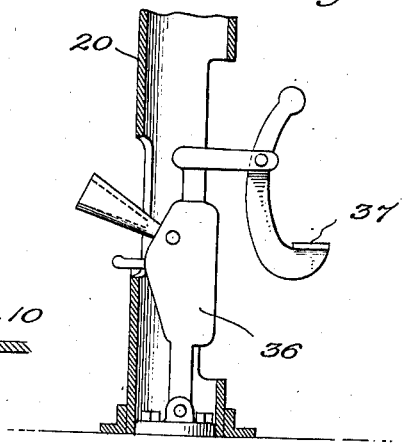
Figure 4 is a vertical section through the lower end of one of the rotary deck columns.

It is desirable that during transit, the weight of the chassis frame and the trailer body and its load be taken off of the springs of the trailer and I provide means for accomplishing this result. This means may conveniently partake of the form of jacking devices 36, shown best in Figure 4. These jacking devices may be mounted within the columns 20 and the sides of the columns cut away sufficiently, in proximity thereto, to permit hangers or brackets 37 of the jacking devices to be brought into engagement with the under side of the chassis frame of the trailer. When this has been accomplished, the jacking devices may be operated pneumatically, electrically, hydraulically or manually to lift such chassis frame sufficiently to take the weight thereof off of the springs. The jacking devices at the opposite sides of the deck may be operated independently or simultaneously as may be desired without departing from this invention.

To preclude sidesway of the trailer while in transit, I preferably provide appropriate means, such, for example, as braces 38 hinged to the deck at 39. The upper ends of these braces may be swung into engagement with the sides of the trailer or the chassis frame thereof and wedges 40, suspended on chains to preclude their loss, may be forced between these braces and the side walls 14 to hold the trailer firmly in position.

In the manner described, the trailer is rendered rigid with respect to the deck against the lateral movement or side-sway, with the weight off the springs of the trailer. Movement of the trailer longitudinally of the deck will be precluded by the same means and by the connection between the trailer and the lower fifth wheel 30 of the car, but I may also supply the raised ends with adjustable stop blocks 41 adapted to bear against the forward end of the chassis frame to take up end thrust.

The trailer T shown as a tank trailer for milk or other liquids, is loaded for rail transportation in the manner described and the trailer T', shown as of the van type, may be loaded and handled in the same way, because the apparatus described is duplicated at both ends of the car. The operation of placing the trailers on the decks and then revolving the decks and anchoring and otherwise preparing the car for movement, may be accomplished in less time than it takes to explain the operation, and with a minimum of effort even though all the work is accomplished manually. Electrical, hydraulic or other power may, however, be used in manipulating the movable devices without departing from this invention, so that the car may be prepared for shipment in much less time and with comparatively little effort as compared to the loading of a car with a corresponding bulk of loose or packaged merchandise. The car may be transported as any railway car without fear of demage to the trailers or to their contents and without requiring opening of the trailers from the point of acceptance by the railroad to the point of delivery of the railroad. Upon reaching this point of delivery, the operations hereinbefore described with reference to loading are reversed for unloading and this work may be done with similar convenience and dispatch.

It is entirely practical in connection with the bulk milk business to run a car with tank trailers thereon on to the siding at a creamery, properly wash and sterilize the tanks thereon and refill and seal the same for shipment without removing the tanks from the car and this can be done in a thoroughly hygienic and sterile manner which will meet all Board of Health requirements.

I have hereinbefore referred to the use of passenger car equipment with respect to couplings, steam connections, etc. When the steam line connection is run through a car of this invention, I find it desirable to tap this line adjacent or beneath each revolvable deck and provide the same with fittings or branching lines which may be in the form of flexible steel hose or otherwise, to permit the application of live steam to all bearings and movable parts, so that this live steam may be utilized for melting away accumulations of ice or snow, which might interfere with the smooth operation of the structure. In Figure 2 of the drawings, I have indicated the steam line at S, one branch line leading to the bearings at 42, and a controlling valve at 43. From this showing any one skilled in art of railway rolling stock will readily understand this phase of the invention. Perforated pipes with appropriate valve connection with the main supply line or the use of flexible hoses with valve connections to the steam line and having perforated outlets will serve the purpose very satisfactorily.

In the foregoing detailed description, I have set forth the present invention in one of its preferred practical forms, and I have shown in some detail operating devices whereby the various movable parts may be actuated. I am aware, however, that these actual mechanical operations may be carried out by apparatus other than that which I have chosen to show and the present invention is, therefore, to be understood as fully commensurate with the appended claims.

Having thus fully described the invention, what I claim as new and desire to secure by Letters Patent is:

1. A railway car of the well type comprising raised ends and a depressed intermediate portion with trucks beneath the raised ends, at least one deck mounted for rotation on the depressed portion of the body, ramps pivotally secured to two opposite sides of the deck and adapted to be lowered from a point inboard of the car into contact with the ground to permit a trailer to be wheeled on to or off of the deck, means on at least one raised end of the car to anchor the forward end of a trailer thereto when the trailer is on the deck with its axis located longitudinally of the car, and operative connections between the ramps and the rotatable deck to guide the ramps into alinement with the wheels of a trailer on the deck when said ramps are lowered into engagement with the ground.

2. A railway car of the well type comprising raised ends and a depressed intermediate portion with trucks beneath the raised ends, at least one deck mounted for rotation on the depressed portion of the body, ramps pivotally connected to two of the opposite sides of the deck, upstanding side walls at the other two sides of the deck, upstanding columns also at the latter sides of the deck, sheaves supported on said columns, hoisting means mounted to revolve with the deck, cables passing from the hoisting means through the sheaves and connected to the ramps to permit the ramps to be raised and lowered by the hoisting means, and jacking devices also carried by the columns and adapted to engage with a trailer on the deck for the purpose of relieving the springs of the trailer from the weight of the chassis and body of the trailer.

3. A railway car of the well type comprising raised ends and a depressed intermediate portion with trucks beneath the raised ends, at least one deck mounted for rotation on the depressed portion of the body, ramps pivotally connected to two of the opposite sides of the deck, upstanding side walls at the other two sides of the deck, upstanding columns also at the latter sides of the deck, sheaves supported on said columns, hoisting means mounted to revolve with the deck, cables passing from the hoisting means through the sheaves and connected to the ramps to permit the ramps to be raised and lowered by the hoisting means, jacking devices also carried by the columns and adapted to engage with a trailer on the deck for the purpose of relieving the springs of the trailer from the weight of the chassis and body of the trailer, and means mounted on the rotatable deck and engageable with the trailer to preclude side-sway of the trailer while in transit.

4. A railway car comprising a car body having thereon at least one deck mounted to revolve, ramps pivotally secured to one edge of the deck for pivotal movement into a position wherein the ramps will extend downwardly in the same inclined plane into engagement with the ground to permit a trailer to be wheeled from the ground onto said deck and vice versa, and means for pivotally elevating said ramps to upstanding positions inboard of the car, said ramps being also pivotally supported on the deck for adjustment into separate substantially vertical planes along the two opposite sides of the deck normal to said edge of the deck.

JOSEPH F. JOHNSON.